United States Patent [19]

Yamazaki et al.

[11] Patent Number: 6,057,034
[45] Date of Patent: May 2, 2000

[54] COATING COMPOSITION FOR OPTICAL FIBER

[75] Inventors: Kyuya Yamazaki; Mitsuhiro Nishimura; Takashi Uemura, all of Osaka; Akira Yamamoto, Matsuida-machi; Shouhei Kozakai, Matsuida-machi; Masatoshi Asano, Matsuida-machi, all of Japan

[73] Assignees: Takeda Chemical Industries, Ltd., Osaka; Shin-Etsu Chemical Co., Ltd., Tokyo, both of Japan

[21] Appl. No.: 09/065,483

[22] Filed: Apr. 24, 1998

[30] Foreign Application Priority Data

Apr. 25, 1997 [JP] Japan ..................................... 9-123136
Mar. 23, 1998 [JP] Japan ..................................... 10-095446

[51] Int. Cl.[7] .............................. C08F 2/50; D02G 3/00; C08G 18/10
[52] U.S. Cl. ............................... 428/378; 522/97; 528/65
[58] Field of Search ....................... 522/96, 97; 428/378; 528/65

[56] References Cited

U.S. PATENT DOCUMENTS 4,902,440  2/1990  Takeyama et al. ........................ 522/96
5,496,870  3/1996  Chawla et al. ............................ 522/90

FOREIGN PATENT DOCUMENTS 34 37 531   4/1985  Germany .
2 163 443   2/1986  United Kingdom .
91 03499    3/1991  WIPO .

*Primary Examiner*—Susan W. Berman
*Attorney, Agent, or Firm*—Wenderoth, Lind & Ponack, L.L.P.

[57] ABSTRACT

In the coating composition for a optical fiber of the present invention, a polyurethane (meth)acrylate oligomer (A), which is based on a urethane prepolymer having an equivalent ratio of NCO group in a polyisocyanate (a) to OH group in a polyol (b) of more than 3.0, is used and the oligomer (A) has a mixing weight ratio of an oligomer (d) having a number average molecular weight of 800 or less to an oligomer (e) having a number average molecular weight of 1,000 or more of 30/70–70/30.

The coating composition of this invention has a low viscosity, and therefore, is suitable for a rapid fiber-drawing in a production of an optical fiber. Further, a cured material obtained from the coating composition of the present invention has both a high elastic modulus and a high elongation, which properties are required for a hard material, and has a slight change of elastic modulus with a change of temperature to improve a long-term reliability of an optical fiber.

5 Claims, No Drawings

COATING COMPOSITION FOR OPTICAL FIBER

TECHNICAL FIELD OF THE INVENTION

The present invention relates to a coating composition for an optical fiber. This composition can be quickly applied because of its low viscosity and has both a high elastic modulus and a high elongation and can maintain the high elastic modulus even at a high temperature.

PRIOR ART

A glass fiber, which can be used as an optical fiber, is very fragile and is easily damaged. Additionally, its optical transmission loss increase because of suffering from pollution. Therefore, in order to protect and reinforce it, immediately after it being drawn, it is primarily coated with a polyurethane (meth)acrylate-base ultraviolet curable resin (hereinafter, referred to as a UV resin) having a low elastic modulus and a small dependency on temperature, and then it is secondarily coated with an ultraviolet curable resin having a high elastic modulus. Sometimes the glass fiber is also tertiarily coated with a colored material in order to distinguish the optical fiber from each other. A coated single fiber is called a fiber elemental strand including the tertiary coating. Furthermore, an article, which is obtained by bundling several fiber elemental strands and making them into a tape-form with a bundling material, is called a tape core-strand. The UV resin is also used as a bundling material. Moreover an article including a plurality of the tape core-strands are used as an optical cable.

An optical fiber wired into a home is called a fiber-to-the home or a drop cable. The cable is made of one or a few fiber elemental strands thickly coated with a UV resin having a high elastic modulus and so on.

Commonly desired properties of a UV resin used for a hard material include a low viscosity, an ability to provide a cured material with a high elasticity, a high elongation, a slight dependency on temperature in the elastic modulus, an excellent long-term reliability and the like.

Especially, recently, when increasing a speed of drawing a glass fiber from a molten base material in order to improve a productivity of an optical fiber, in the subsequent step of coating with a UV resin having a high viscosity an applied layer occasionally becomes blurred in thickness and/or the optical fiber partially fails to be coated. Consequently some strain and deterioration will generate in the optical fiber to cause a light transmission loss. Generally, a coating composition for an optical fiber can be obtained by reacting about 2 equivalent of isocyanate and 1 equivalent of polyol to produce a urethane prepolymer, then reacting the prepolymer with a hydroxyl group-containing (meth)acryl monomer to form a polyurethane (meth)acrylate, and then blending the reaction mixture with an ethylenically unsaturated compound as a reactive dilutent, as disclosed in JP A 63-275619 (U.S. Pat. No. 2,525,177). However, according to that process, the amount of ingredient with a high molecular weight will increase because of a side-reaction during a urethane prepolymerization to merely provide a coating composition having a high viscosity. Hence a large amount of reactive diluent will be used for the sake of lowering the viscosity. However, in this case a coating composition with a high elastic modulus can be obtained, but at the same time the elongation is decreased.

Although a slot-type fiberoptic cable, which includes a plurality of 4- or 8-fiber ribbons, is used at present, recently some attempts have been made to increase the number of the tape core strand for accomplishing development of 12- or 16-fiber ribbons for the purpose of core-multiplication and heightening density.

Because of these circumstances, trials to change the thickness of tape coating from 0.40 mm (this is the present standard) to 0.30 mm in view of improving core-strand arrangement, homogenizing a coat structure, thining and lightening cables have been made. Thinning cables, however, causes a deterioration of mechanical properties and lateral pressure properties (a transmission loss by a lateral pressure), as well as a deterioration of a function to protect from the outside. There has been a proposed method for increasing the elastic modulus of the bundling material as much as possible in order to avoid deterioration in properties. However, when increasing the elastic modulus, the elongation will be lowered to cause an increase of transmission loss. Hence, it has been difficult to obtain a bundling material fully satisfying these properties.

SUMMARY OF THE INVENTION

An object of the present invention is to provide a coating composition for an optical fiber which has 2.5 or less of a storing change in storage modulus between 25° C. and 60° C., and therefore, the coating composition can be lowered in viscosity and has excellent quick applying properties without losing its high elastic modulus (2.5% tensile modulus of 300–1200 MPa) and/or its high elongation (30% or more).

The present inventors have made! extensive studies for solving the above problems. As a result they found that a coating composition for an optical fiber, which has a high elastic modulus, a high elongation and a slight change in elastic modulus with a change in temperature and which is capable of lowering a viscosity and which has excellent quick applying properties, can be obtained by using a polyurethane (meth)acrylate based on a urethane prepolymer obtained by a reaction of a polyol and highly excessive polyisocyanate.

Accordingly, the present invention provides (1) a coating composition for an optical fiber comprises:
   (A) a polyurethane (meth)acrylate oligomer which is obtainable by subjecting (a) a polyisocyanate, (b) a polyol and (c) a (meth)acrylate monomer containing a hydroxyl group to a urethanation reaction;
   (B) an ethylenically unsaturated compound; and
   (C) a photopolymerization initiator, wherein the urethanation reaction is conducted under conditions that an equivalent ratio of NCO group in (a) to OH group in (b) is more than 3.0, and that a ratio of a remaining equivalent of NCO group calculated by subtracting the equivalent of OH group in (b) from the equivalent of NCO group in (a) to an equivalent of OH group in (c) is within a range of 0.9–1.1;

(2) the coating composition for an optical fiber as described in the above (1), wherein, in (A), a proportion of a total amount of (d) a component with a number average molecular weight of 800 or less and (e) a component with a number average molecular weight of 1,000 or more to the total amount of (A) is 30% by weight or more and a weight ratio of (d) to (e) is 30/70–70/30;

(3) the coating composition for an optical fiber as described in the above (1), wherein, in (A), a weight ratio of (d) to (e) is 51/49–70/30; and (4) the coating composition for an optical fiber as described in the above (1), wherein, in (A), a proportion of a total amount of (d) and (e) to the total amount of (A) is 40% by weight or more.

DETAILED DESCRIPTION OF THE INVENTION

Polyisocyanate (a) used in the present invention may be, for example, an aromatic polyisocyanate, an aromatic aliphatic polyisocyanate, an alicyclic polyisocyanate, an aliphatic polyisocyanate, and the like.

Examples of the aromatic polyisocyanate include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate, and the like; and polyisocyanates such as triphenylmethane-4,4',4"-triisocyanate, 1,3,5-triisocyanatebenzene, 2,4,6-triisocyanatetoluene, 4,4'-diphenylmethane-2,2',5,5'-tetraisocyanate, and the like.

Examples of the aromatic aliphatic polyisocyanate include diisocyanates such as 1,3- of 1,4-xylylene diisocyanate or a mixture thereof, 1,3- or 1,4-bis(1-isocyanate-1-methylethyl)benzene or mixtures thereof, and the like; and polyisocyanates such as 1,3,5-triisocyanatemethylbenzene, and the like.

Examples of the alicyclic polyisocyanate include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatemethyl)cyclohexane, and the like; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1)heptane, 2-(3-isocyanatepropyl)-2,6-di(isocyanatemethyl)-bicyclo(2.2.1) heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2.2.1) heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, 6-(2-isocyanateethyl)-2-isocyanatemethyl-2-(3-isocyanatepropyl)-bicyclo(2.2.1)heptane, and the like.

Examples of the aliphatic polyisocyanate include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatemethylcaproate, and the like; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, 2,5,7-trimethyl-1,8-isocyanate-5-isocyanatemethyloctane, and the like.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDI, and an adduct of an isocyanate compound and a polyol with a low molecular weight, and the like.

Among these polyisocyanates, diisocyanates including, for example, aromatic diisocyanates such as 2,4- or 2,6-tolylene diisocyanate, 4,4'-diphenylmethane diisocyanate, and the like; aromatic aliphatic diisocyanates such as 1,3- or 1,4-xylylene diisocyanate, and the like; alicyclic diisocyanates such as isophorone diisocyanate, 1,3- or 1,4-bis(isocyanatemethyl)cyclohexane, and the like; aliphatic diisocyanates such as hexamethylene diisocyanate, and the like; and mixtures thereof are usually used.

Polyol (b) may be polyols with a number average molecular weight of about 200–10,000 such as polyether polyol, polyesterpolyol, polycarbonate polyol, urethanated polyol, and the like. Among them, polyether polyol, polycarbonate polyol and urethanated polyol are preferably used. The use of diols is particularly preferred.

Polyetherpolyol may be homopolymers or copolymers of alkylene oxides including $C_{2-5}$ alkylene oxides such as, for example, ethylene oxide, propylene oxide, butylene oxide, tetrahydrofuran, 3-methyltetrahydrofuran, and the like; homopolymers or copolymers of the above alkylene oxides obtained by using, as an initiator, $C_{14-40}$ polyols such as 12-hydroxystearyl alcohol, hydrogenated dimerdiol, and the like; and adducts of the above alkylene oxides with bisphenol A or hydrogenated bisphenol A, and the like. These polyetherpolyols may be used alone or in combination of two or more. Preferable polyetherpolyols include homopolymers or copolymers of $C_{2-5}$ alkylene oxides, especially $C_{3-4}$ alkylene oxides that is propylene oxide and tetrahydrofuran; and homopolymers or copolymers of $C_{2-4}$ alkylene oxides obtained by using $C_{14-40}$ polyols as an initiator.

Polyesterpolyol may be, for example, addition reaction products of a diol component and a lactone, reaction products of the diol component and a polyvalent carboxylic acid and addition reaction products of three components including the diol component, a dibasic acid and the lactone. The diol component may be $C_{2-40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, hydrogenated dimerdiol and the like; and an alkylene oxide adduct of bisphenol A. The lactone may be, for example, ε-caprolactone, δ-valerolactone, β-methyl-δ-valerolactone and the like. The polyvalent carboxylic acid may be, for example, aliphatic dicarboxylic acids such as succinic acid, adipic acid, azelaic acid, sebacic acid, dodecanedioic acid and the like; and aromatic dicarboxylic acids such as hexahydrophthalic acid, tetrahydrophthalic acid, phthalic acid, isophthalic acid, terephthalic acid, and the like.

Polycarbonatepolyol may be, for example, polycarbonatediols which are obtainable by a reaction of a short chain dialkylcarbonate and a component selected from aforementioned polyetherpolyols, polyesterpolyols and diol components such as 2-methylpropanediol, dipropylene glycol, 1,4-butanediol, 1,6-hexanediol, 3-methyl-1,5-pentanediol, neopentyl glycol, 1,5-octanediol, 1,4-bis-(hydroxymethyl)cyclohexane, and the like. The short chain dialkylcarbonate may be $C_{1-4}$ alkylcarbonates such as, for example, dimethylcarbonate and diethylecarbonate.

In addition, polyesterdiols, which are addition products of the above polycarbonatepolyol, and alkylene oxides such as ethylene oxide, propylene oxide, butylene oxide and the like or lactones such as ε-caprolactone, β-methyl-δ-valerolactone and the like, can be used.

Examples of commercially available polycarbonate diol may be DESMOPHENE 2020E (manufactured by Sumitomo Bayer Co., Ltd.), DN-980, DN-982 and DN-983 (manufactured by JAPAN POLYURETHANE INDUSTRY CO., LTD.).

If necessary, polyols with a low molecular weight may be used. Examples of polyols with a low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol (a reduction product of Japanese acid), chimyl alcohol, batyl alcohol, selachyl alcohol, dimeric acid diol and the like.

Urethanated polyols may be urethanated polyols with a terminal hydroxyl group which is obtainable by reacting the above polyisocyanates and the above polyols in equivalent ratio of NCO group to OH group of 1.0 or less, preferably 0.2–0.7, more preferably 0.2–0.5. Besides the above polyols, if necessary, silicon polyols, fluorine polyols, polyolefin polyols and the like may be used.

Hydroxyl group-containing (meth)acryl monomer (c) may be, for example, 2-hydroxyethyl (meth)acrylate, 2-hydroxypropyl (meth)acrylate, 2-hydroxybutyl (meth) acrylate, 4-hydroxybutyl (meth)acrylate, pentanediol mono (meth)acrylate, 2-hydroxy-3-phenyloxypropyl (meth) acrylate, 2-hydroxyalkyl(meth)acryloyl phosphate, 4-hydroxycyclohexyl (meth)acrylate, cyclohexanedimethanol mono(meth)acrylate, neopentyl glycol mono(meth) acrylate, trimethylolpropane di(meth)acrylate, pentaerythritol tri(meth)acrylate, and the like. In addition, compounds which are obtainable by an addition reaction of a glycidyl group-containing compound and a (meth)acrylic acid, such as alkyl glycidyl ether and glycidyl (meth)acrylate, may be used. The above hydroxyl group-containing (meth)acrylates may be used alone or in combination of two or more.

Preferred hydroxyl group-containing (meth)acrylates are 2-hydroxyethyl (meth)acrylate, 2-hydroxypropyl (meth) acrylate, and the like.

Polyurethane (meth)acrylate oligomer (A) can be prepared by reacting the above-mentioned components. Although a manner of reacting the components is not particularly restricted, it is the most suitable for obtaining the oligomer (A) having a low viscosity that polyol (b) and highly excessive polyisocyanate (a) are reacted to produce a urethane prepolymer almost without any side-reactions, and the thus obtained prepolymer is further reacted with a hydroxyl group-containing (meth)acrylate. In this case, a manufacturing process can be simplified, because the oligomer (A) can be produced in a single reactor and a single batch.

In order to obtain a coating composition for an optical fiber, having the following characteristics of a low viscosity, a high elastic modulus, a high elongation and a slight change in elastic modulus with change in temperature, it is necessary to use, as the polyurethane (meth)acrylate oligomer (A), a polyurethane (meth)acrylate oligomer which is obtained by reacting (a) a polyisocyanate, (b) a polyol and (c) a (meth)acrylate monomer under conditions where an equivalent ratio of NCO group in (a) to OH group in (b) is more than 3.0, preferably 3.1–30, more preferably 3.5–28, and a ratio of a remaining equivalent of NCO group calculated by subtracting the equivalent of OH group in (b) from the equivalent of NCO group in (a) to an equivalent of OH group in (c) is within a range of 0.9–1.1, preferably 0.95–1.0. A polyurethane (meth)acrylate oligomer (A), in which a proportion of a total weight of (d) a component with a number average molecular weight of 800 or less and (e) a component with a number average molecular weight of 1,000 or more to the total weight of (A) is 30% by weight or more, preferably 40% by weight or more, and a weight ratio of (d) to (e) is within a range of 30/70–70/30, preferably 51/49–70/30, more preferably 51/49–65/35, are used.

In addition, an adduct (f) of a polyisocyanate and a hydroxyl group-containing (meth)acryl monomer, which being one of (d) the component with a number average molecular weight of 800 or less, exists in the polyurethane (meth)acrylate oligomer (A) which is obtained by a reaction under conditions where an equivalent ratio of NCO in polyisocyanate (a) to OH in polyol (b) is more than 3.0. The adduct (f) corresponds to a multi-functional urethane group-containing reactive diluent. By adjusting the equivalent ratio of NCO group in (a) to OH group in (b), it is possible to adjust a content of the adduct (f). When the content of the adduct (f) increases, the viscosity of the coating composition will be lowered and the elastic modulus of a cured film will increase. The adduct (f), unlike multi-functional reactive diluents (multi-functional ethylenically unsaturated compounds) which are generally used, is a very useful compound which has a significant effect to improve the elastic modulus and lower the viscosity of the oligomer without any loss of both elongation and balance of mechanical properties.

In the case that the equivalent ratio of NCO group to OH group is 3.0 or less, the viscosity becomes too high and results in a deterioration of a rapid fiber-drawing applicability and a large change of elastic modulus with a change of temperature. When the equivalent ratio of NCO group to OH group is more than 30, although lowering the viscosity and increasing the elastic modulus are successfully accomplished, the elongation tends to lower. In addition, if the weight ratio of (d) to (e) is less than 30/70, a change of elastic modulus with a change of temperature will increase. The weight ratio of (d) to (e) being more than 70/30, which makes it difficult to keep the balance between the elastic modulus and the elongation, is not preferable because the elongation remarkably decreases although both lowering the viscosity and increasing the elastic modulus are successfully accomplished.

In the urethanation reaction, conventional urethanation catalysts such as tertiary amine catalysts, tin catalysts, lead catalysts and the like may be used.

Example of the tertiary amine catalysts include compounds having at least one tertiary nitrogen atom in a molecular.

Examples of tertiary amine compounds having one tertiary nitrogen atom include triethylamine, N,N-dimethylcyclohexylamine, N-methylmorpholine, N-ethylmorpholine, N-(2-hydroxyethyl)morpholine, N,N-dimethyl-p-toluidine, β-(dimethylamino)propionitrile, N-methylpyrrolidone, N,N-dicyclohexylmethylamine and the like.

Examples of tertiary amine compounds having two nitrogen atoms include N,N,N',N'-tetramethylethylenediamine, N,N,N',N'-tetramethylpropane-1,3-diamine, N,N,N',N'-tetramethylhexane-1,6-diamine, bis(N,N-dimethylaminoethyl)ether, bis(2-dimethylaminoethyl)ether, ethylene glycol bis(3-dimethyl)aminopropyl ether, N'-cyclohexyl-N,N-dimethylformamidine, N,N'-dimethylpiperazine, trimethylpiperazine, 1,2-peperidinoethane, bis(aminopropyl)piperazine, N-methyl-N'-(2-hydroxyethyl)piperazine, N-(N',N'- dimethylaminoethyl)morpholine, bis(morpholinoethyl) ether, bis(2,6-dimethylmorpholinoethyl)ether, 1,2-dimethylimidazole, N-methylimidazole, 1,4-diazine, diazabicyclo[2.2.2]-octane (DABCO), 1,4-diazabicyclo[3.3.0] oct-4-ene, 1,5-diazabicyclo[4.3.0]non-5-ene (DBN), 1,8-diazabicyclo-[5.4.0]-undec-7-ene (DBU), phenolates thereof, octoates thereof, and the like.

Examples of tertiary amine compounds having three nitrogen atoms include N,N,N',N",N"-pentamethyldiethylenetriamine, N,N,N',N",N"-pentamethyldipropylenetriamine, tetramethylguanidine, N-cyclohexyl-N',N',N",N"-tetramethylguanidine, N-methyl-N'-(2-dimethylamino)ethylpiperazine, 1,5,7-triazabicyclo[4.4.0]dec-5-ene and the like.

Examples of tertiary amine compounds having four nitrogen atoms include 1,1,4,7,10,10-hexamethyltriethylenetetramine, 1,3,5-tris(N,N-dimethylpropyl)hexahydro-1,3,5-triazine and the like.

Examples of the tin catalysts include stannous octoate, dibutyltin diacetate, dibutyltin dilaurate, dibutyltin mercaptide, dibutyltin thiocaboxylate, dibutyltin dimaleate, dioctyltin mercaptide, dioctyltin thiocarboxylate and the like.

Examples of the lead catalysts include lead 2-ethylhexanate and the like.

Mercury catalyst such as, for example, phenylmercury propionate can also be used as the urethanation catalyst.

The amount of the urethanation catalyst to be used is 0.001–1.0% by weight based on the weight of the polyurethane (meth)acrylate oligomer (A), preferably 0.005–0.5% by weight, more preferably 0.01–0.2% by weight.

The ethylenically unsaturated compound, which functions as a reactive diluent, may be polymerizable compounds which are liquid or solid at room temperature (about 15–30° C.). The ethylenically unsaturated compound includes mono-functional compounds, bi-functional compounds and poly-functional compounds.

Examples of the mono-functional compounds (mono-functional polymerizable dilutents) include heterocyclic ethylenically unsaturated compounds such as N-vinyl heterocyclic compounds including N-vinyl pyrrolidone, N-vinylpyridine, N-vinylcaprolactam and the like, and heterocyclic (meth)acrylates including morpholine (meth) acrylate, tetrahydrofurfuryl (meth)acrylate and the like; N-vinylacetamide; N-vinylformamide; diacetone acrylamide; dialkylaminoethyl (meth)acrylates such as dimethylaminoethyl (meth)acrylate, diethylaminoethyl (meth) acrylate and the like; N,N'-dimethylacrylamide; alkoxy (poly)alkylene glycol (meth)acrylates such as methoxyethylene glycol (meth)acrylate, methoxypolyethylene glycol (meth)acrylate, butoxypolyethyleneglycol (meth)acrylate and the like; alkylphenoxyethyl (meth)acrylates such as nonylphenoxyethyl (meth)acrylate; phenoxy(poly)alkylene glycol (meth)acrylates such as phenoxyethyl (meth)acrylate, phenoxypolyethylene glycol (meth)acrylate and the like; cumylphenol(poly)alkylene (meth)acrylate; alkyl (meth)acrylates such as butyl (meth)acrylate, 2-ethylhexyl (meth)acrylate and the like; cycloalkyl (meth) acrylates such as cyclohexyl (meth)acrylate and the like; aralkyl (meth)acrylates such as benzyl (meth)acrylate and the like; cross-linked alicyclic hydrocarbon group-containing di(meth)acrylates such as isobornyl (meth) acrylate, dicyclopentanediene (meth)acrylate, dicyclopentenyl (meth)acrylate, tricyclodecanyl (meth)acrylate, dicyclopentenyloxyalkyl (meth)acrylate, tricyclodecanyloxyethyl (meth)acrylate, isobornyloxyethyl (meth)acrylate and the like; hydroxyl group-containing (meth)acrylates such as 2-hydroxypropyl (meth)acrylate, 3-chloro-2-hydroxypropyl (meth)acrylate, 2-hydroxy-3-phenoxypropyl (meth)acrylate, 2-(meth)acryloyloxyethyl-2-hydroxyethylphthalic acid, 3-acryloyloxyglycerin (meth)acrylate, 2-hydroxybutyl (meth)acrylate, 2-hydroxy-1-(meth)acryloyloxy-3-(meth)acryloyloxypropaine, polypropylene glycol mono(meth)acrylate, polyethylene glycol mono(meth)acrylate and the like; poly ε-caprolactone mono(meth)acrylate; glycidyl (meth)acrylate; mono[2-(meth) acryloyloxyethyl]accid phosphate; halogen-containing (meth)acrylates such as trifluoroethyl (meth) acrylate, 2,2,3,3-tetrafluoropropyl (meth)acrylate, 2,2,3,4,4,4-hexafluorobutyl (meth)acrylate, perfluorooctylethyl (meth)acrylate and the like.

Examples of the bi-functional compounds (bi-functional polymerizable dilutent) include di(meth)acrylates of 2,2-dimethyl-3-hydroxypropyl-2,2-dimethyl-3-hydroxypropionate such as, for example, "MANDA" manufactured by NIPPON KAYAKU CO., LTD.; (polyoxy)alkylene glycol di(meth)acrylates such as ethylene glycol di(meth)acrylate, diethylene glycol di(meth)acrylate, tetraethylene glycol di(meth)acrylate, polyethylene glycol di(meth)acrylate, propylene glycol di(meth)acrylate, polypropylene glycol di(meth)acrylate, 1,4-butanediol di(meth)acrylate, 1,6-hexane glycol di(meth)acrylate, neopentyl glycol di(meth)acrylate, pentanediol di(meth)acrylate and the like; glycerin di(meth)acrylate; trimethylpropane di(meth)acrylate; pentaerythritol di(meth)acrylate; di(meth) acrylates of adducts formed from bisphenol A and an alkylene oxide including ethylene oxide, propylene oxide, butylene oxide and the like such as a di(meth)acrylate of 2,2-bis(2-hydroxyethoxyphenyl)propane and the like; cross-linked alicyclic hydrocarbon group-containing di(meth) acrylates such as tricyclodecane dimethanol di(meth) acrylate, dicyclopentadiene di(meth)acrylate and the like; acrylic acid-addition products of bi-functional epoxy resins such as an addition-product of 2,2-bis(glycidyloxyphenyl) propane with (meth)acrylic acid and the like.

Examples of the poly-functional compounds (poly-functional polymerizable dilutents) include trimethylolpropane tri(meth)acrylate, trimethylolpropane trioxyethyl (meth)acrylate, pentaerythritol tri(meth)acrylate, pentaerythritol tetra(meth)acrylate, dipentaerythritol hexa (meth)acrylate, tris(acryloxy)isocyanurate, a tri(meth) acrylate of tris(hydroxyethyl)isocyanurate, a tri(meth) acrylate of tris(hydroxypropyl)isocyanurate, triallyltrimellitic acid, triallyl isocyanurate and the like.

These ethylenically unsaturated compounds can be used alone or in combination of two or more. The ethylenically unsaturated compounds can be chosen according to the manner of coating optical fibers. For example, when being used for primarily coating or secondarily coating an optical fiber, nitrogen-containing heterocyclic compounds such as N-vinylpyrrolidone, N-vinylcaprolactam and the like and a cross-linked alicyclic hydrocarbon group-containing acrylates such as isobornyl acrylate, dicyclopentadiene acrylate, isobornyloxyethyl acrylate, tricyclodecanedimethanol diacrylate and the like are generally used. In addition to them, when forming a hard coating, bi-functional compounds such as (polyoxy)alkylene glycol di(meth)acrylate and a di(meth) acrylate of an adduct of bisphenol A with an alkylene oxide or poly-functional compounds such as trimethylolpropane tri(meth)acrylate, pentaerythritol tetra(meth)acrylate and the like are also generally used, if necessary.

The amount of the ethylenically unsaturated compounds to be used can be selected, for example, within a range of about 10–100 parts by weight, preferably about 20–80 parts by weight, more preferably about 30–70 parts by weight based on 100 parts by weight of the polyurethane (meth) acrylate oligomer (A), according to the kinds of the polyurethane (meth)acrylate oligomer (A) and the ethylenically unsaturated compound (B), a viscosity required for the coating composition and desired properties of the cured material.

Examples of the photopolymerization (C) are photopolymerization initiators of initiators of acetophenone type, benzoin type, benzophenone type, thioxanthone type or the like, or acylphosphine oxide type photopolymerization initiators represented by the following general formula:

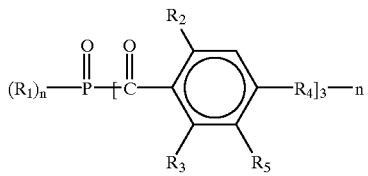

(1)

wherein $R_1$ represents an alkyl group containing 1–12 carbon atoms, an cyclopentyl group, a cyclohexyl group, or a phenyl group or naphthyl group which may be substituted by an alkyl group containing 1–12 carbon atoms and/or a halogen atom, $R_2$ and $R_3$ represent an alkyl group or alkoxy group having 1–12 carbon atoms, $R_4$ represents a hydrogen atom or an alkyl group having 1–12 carbon atoms, $R_5$ represents a hydrogen atom or a methyl group, and n represents 1 or 2.

Examples of the acylphosphine oxide type photopolymerization initiators include 2,4,6-trimethylbenzoyldiphenylphosphine oxide such as Lucirin TPO manufactured by BASF Co., bis(2,6-dimethoxybenzoyl)-2,4,4-trimethylpentylphosphine oxide (BAPO), bis(2,4,6-trimethylbenzoyl)methylphosphine oxide, bis(2,4,6-trimethylbenzoyl)phenylphosphine oxide such as Irgacure 819, manufactured by Ciba Specialty Chemicals Co., bis(2,4,6-trimethylbenzoyl)ethylphosphine oxide, bis(2,4,6-trimethylbenzoyl)n-butylphosphine oxide and the like.

Examples of the acetophenone type photopolymerization initiators include diethoxyacetophenone, 2-hydroxy-2-methyl-1-phenylpropane-1-one such as Darocur 1173 manufactured by Ciba Specialty Chemicals Co., benzyl dimethyl ketal such as Irgacure 651 manufactured by Ciba Specialty Chemicals Co., Lucirin BDK manufactured by BASF Co. and the like, 1-hydroxycyclohexyl phenyl ketone sulch as Irgacure 184 manufactured by Ciba Specialty Chemicals Co., 2-methyl-2-morpholino(4-thiomethylphenyl)propane-1-one such as Irgacure 907 manufactured by Ciba Specialty Chemicals Co., 2-benzyl-2-dimethylamino-1-(4-morpholinophenyl)-butanone such as Irgacure 369 manufactured by Ciba Specialty Chemicals Co., an oligomer of 2-hydroxy-2-methyl-1-[4-(1-methylvinyl)phenyl] propanone such as Esacure KIP manufactured by Lamberti Spa.

Examples of the benzoin ether type photopolymerization initiators include benzoin, benzoin methyl ether, benzoin ethyl ether, benzoin isopropyl ether, benzoin isobutyl ether and the like.

Examples of the benzophenone type photopolymerization initiators include benzophenone, O-benzoylmethylbenzoate, 4-phenylbenzophenone, 4-benzoyl-4'-methyldiphenyl sulfide, 2,4,6-trimethylbenzophenone, (4-benzoylbenzyl) trimethylammonium chloride and the like.

Examples of the thioxanthone type photopolymerization initiators include 2- or 4-isopropylthioxanthone, 2,4-diethylthioxanthone, 2,4-dichlorothioxanthone and the like.

Besides them, methyl phenylglycxylates such as Vicure 55 manufactured by AKZO NOBEL Coatings K. K., 3,6-bis(2-morpholinoisobutyl)-9 -butylcarbazcile such as A-Cure 3 manufactured by Asahi Denka Kogyo K. K., titanocen compounds and the like can be used as the photopolyrmerization initiators.

Further, these photopolymerization initiators can also be used in combination. Commercially available examples thereof include Irgacure 1700 [the weight ratio of bis (2,6-dimethoxybenzoyl)-2,4,4-trimethylpentylphosphine oxide to 2-hydroxy-2-methylphenylpropane-1-one being 25/75, manufactured by Ciba Specialty Chemicals Co.], Irgacure 1800 [the weight ratio of bis(2,6-dimethoxybenzoyl)-2,4,4,-trimethylpentylphosphine oxide to 1-hydroxycyclohexyl phenyl ketone being 25/75, manufactured by Ciba Specialty Chemicals Co.], Irgacure 1850 [the weight ratio of bis(2,6-dimethoxybenzoyl)-2,4,4-trimethylpentylphosphine oxide to 1-hydroxycyclohexyl phenyl ketone being 50/50, manufactured by Ciba Specialty Chemicals.

The amount of the photopolymerization initiators to be used can generally be selected within a range of about 0.1–10 parts by weight, preferably about 0.5–5 parts by weight per 100 parts by weight of the sum of the polyurethane (meth)acrylate oligomer (A) and the ethylenically unsaturated compound (B).

If necessary, various photopolymerization promoters such as dialkylaminobenzoic acids or derivatives thereof such as 4-dimethylaminobenzoic acid, 4-dimethylaminobenzoates and the like, phosphine type photopolymerization promoters, that is phosphine compounds including trialkylphosphines, arylphosphines including triphenyphosphine and the like can be incorporated to the coating composition of the present invention. The amount of these polymerization promoters to be incorporated can be selected, for example, within a range of about 0.01–10 parts by weight based on 100 parts by weight of the sum of the polyurethane (meth)acrylate oligomer (A) including tertiary amine compounds and the ethylenically unsaturated compound (B).

Small amount of stabilizers can also be added to the coating composition of the present invention. As the stabilizers, hindered phenol type antioxidants, hindered amine type antioxidants, sulfur type antioxidants and the like can be used.

Examples of the hindered phenol type stabilizers include compounds having a hydroxyphenyl group substituted by a tert-butyl group such as 2,6-di-tert-butylhydroxytoluene, 2,2'-methylenebis(4-methyl-6-tert-butylphenol), 4,4'-butylidenebis(3-methyl-6-tert-butylphenol), triethylene glycol-bis[(3-tert-butyl-5-methyl-4-hydroxyphenyl) propionate], 1,6-hexanediolbis[3-(3,5-di-tert-butyl-4-hydroxyphenyl)propionate], pentaerythritol-tetrakis[3-(3,5-di-tert-butyl-4-hydroxyphenyl)propionate], 2,4-bis(n-octylthio)-6-(4-hydroxy-3,5-di-tert-butylanilino)-1,3,5-triazine, 2,2-thio-diethylenebis[3-(3,5-di-tert-butyl 4-hydroxyphenyl)propionate], octadecyl-3-(3,5-di-tert-butyl-4-hydroxyphenyl)propionate, 2,2'-thiobis(4-methyl-6-tert-butyl)phenol, 4,4'-thiobis(3-methyl-6-tert-butyl)phenol, N,N'-hexamethylenebis(3,5-di-tert-butyl-4-hydroxyhydrocinnamamide), 3,5-di-tert-butyl-4-hydroxybenzylphosphonate-diethyl ester and the like.

Examples of the hindered amine antioxidants include bis(2,2,6,6-tetramethylpiperidinyl-4-sebacate), condensation polymerized products of dimethyl succinate and 1-(2-hydroxyethyl)-4-hydroxy-2,2,6,6-tetramethylpiperidyl and the like.

Examples of the sulfur type antioxidants include dilauryl 3,3'-thiodipropionate, dimyristyl 3,3'-thiodipropionate, distearyl 3,3'-thiodipropionate, pentaerythritol tetrakis(β-laurylthiopropionate), ditridecyl 3,3'-thiopropionate, 2-mercaptobenzimidazole and the like.

The amount of these antioxidants to be incorporated is not more than 2.0% by weight based on 100 parts by weight of the sum of the polyurethane (meth)acrylate oligomer (A) and the ethylenically unsaturated compound (B), more preferably 0.1–1.0% by weight with taking a balance of the amount of hydrogen gas which will generate and a curing speed into consideration.

Besides the above-mentioned components, the coating composition of the present invention may include various additives such as stabilizers including antioxidants other than the aforementioned ones, ultraviolet absorbents and the like, plasticizers, organic solvents, silane coupling agents, water-spatterable silane compounds, modified silicon oil, levelling agents, surface-active agents, coloring pigments, organic or inorganic fine particles and the like.

The coating composition for an optical fiber of the present invention has a low viscosity of 1,000–5,000 cps/25° C., which is suitable for a quick application, without using a large amount of reactive diluents. Further, a cured product has both a high elastic modulus and a high elongation required for a hard material, that is, the Young's modulus of 30–120 kg/mm2 and the elongation of 30% or more at 25° C. It also has a slight change of tensile storage modulus with a change of temperature, that is a ratio of the elastic modulus at 25° C. to that at 60° C., being 2.5 or less. Therefore, the coating composition of the present invention is suitable for producing an optical fiber with a slight transmission loss.

The coating composition for optical fibers of the present invention is suitable for a ultraviolet-curing type coating material for an optical fiber indirectly with making at least a primary coating (primary layer) exist among the coating composition and an optical fiber. Namely, the coating composition of the present invention can be used as a material for coating fibrous elementary strands such as a secondary coating layer (secondary layer) or a tertiary coating layer (tertiary layer)of the optical fiber according to the properties of a cured resin obtained therefrom such as the Young's modulus, the elastic modulus, the elongation and the like. It can also be used as a bundling material, which makes tape core strands comprising a plurality of fiber elemental strands into a tape, a coating material for coating drop cables, a waterproof coating for fibrous cables, a buffer for seabed cables and the like. Among them, it is especially useful as the bundling material and the coating material for drop cables.

An optical fiber which is indirectly coated with a cured film of such a coating composition can be obtained by indirectly coating the optical fiber with Ahe aforementioned composition, and then curing the composition by a light irradiation, especially an ultraviolet irradiation.

EXAMPLES

The present invention will be further illustrated in detail by preparation examples, examples and comparative examples, which do not limit the scope of the present invention.

Preparation Example 1
Synthesis of Urethanepolyol

A mixed liquid of hexamethylene diisocyanate (75.7 g), polytetramethylene ether glycol having a number average molecular weight of 2,000 (774.0 g) and polyoxypropylene glycol having a number average molecular weight of 2,000 (1,026 g) was reacted for 3 hours while controlling the temperature at 80–90° C. in an atmosphere of nitrogen.

After addition of stannous octoate (0.19 g) as a reaction catalyst, the mixture was further reacted for 4 hours. After confirming that the absorption due to an isocyanate group (NCO) was not detected by an infrared absorption spectrum (IR-spectrum), urethanepolyol 1 was obtained. A number average molecular weight of the urethanepolyol 1 was 4,168.

Preparation Example 2
Synthesis of Urethanepolyol

A mixed liquid of hexamethylene diisocyanate (33.6 g), polytetramethylene ether glycol having a number average molecular weight of 3,000 (600.0 g) and polyoxypropylene glycol having a number average molecular weight of 3,000 (600.0 g) was reacted for 3 hours while controlling the temperature at 80–90° C. in an atmosphere of nitrogen.

After addition of stannous octoatle (0.12 g) as a reaction catalyst, the mixture was further reacted for 4 hours. After confirming that the absorption due to NCO group was not detected by IR-spectrum, urethanepolyol 2 was obtained. A number average molecular weight of the urethanepolyol 2 was 6,168.

Example 1

A mixed liquid of 2,4-toluene diLsocyanate (515.7 g), polytetramethylene ether glycol having a number average molecular weight of 2,000 (422.9 g), polyoxypropylene glycol having a number average molecular weight of 400 (219.9 g) and trioxypropylene glycol (16.2 g) was reacted for 3 hours while controlling the temperature at 70–80° C. in an atmosphere of nitrogen. After cooling the reaction mixtujre to 40° C., the atmosphere in the reaction vassal was replaced with dried air and then 2-hydroxyethyl acrylate (501.4 g) and 2,6-di-tert-butylhydroxytoluene (0.5 g) as a polymerization inhibitor were added. After raising the temperature gradually, the mixture was allowed to react for 2 hours at 60–7° C. After addition of 1,8-diazabicyclo[5.4.0]-7-undecene (0.54 g) as a reaction catalyst, the mixture was further reacted for 4 hours. After confirming that the absorption due to an isocyanate group (NCO) was not detected by an infrared absorption spectrum (IR-spectrum), polyurethane acrylate oligomer A-1 was obtained. The oligomer A-1 was a mixture of 33% by weight of a component having a number average molecular weight of 2,580, 32% by weight of a component having a number average molecular weight of 980, 4% by weight of a component having a number average molecular weight of 772 and 31% by weight of a component having a number average molecular weight of 406.

The thus obtained oligomer A-1 (67 parts by weight), isobornyl acrylate (19 parts by weight), N-vinylpyrrolidone (9 parts by weight), a diacrylate of 2,2-dimethyl-3-hydroxypropyl-2,2-dimethyl-3-hydroxypropionate (2 parts by weight), tricyclodecanedimethanol diacrylate (3 parts by weight) and a photopolymerization initiator, Irgacure 1700 manufactured by Ciba Specialty Chemicals Co. (3 parts by weight) were compounded to obtain a coating composition 1.

Example 2

According to the same manner as Example 1, 2,4-toluene diisocyanate (578.3 g), polytetramethylene ether glycol having a number average molecular weight of 3,000 (358.6 g), polyoxypropylene glycol having a number average molecular weight of 1000 (166.0 g) and trioxypropylene glycol (72.7 g) were reacted. After adding 2-hydroxyethyl acrylate (628.5 g), 2,6-di-tert-butylhydroxytoluene (0.54 g) as a polymerization inhibitor and 1,8-diazabicyclo[5.4.0]-7-undecene (0.54 g) as a reaction catalyst to the thus obtained reaction mixture, the operations were conducted as the same manner as Example 1 to obtain polyurethane acrylate oligomer A-2. The oligomer A-2 was a mixture of 24% by weight of a component having a number average molecular weight of 3,580, 15% by weight of a component having a number average molecular weight of 1,580, 16% by weight of a component having a number average molecular weight of 772 and 45% by weight of a component having a number average molecular weight of 406.

Thus obtained oligomer A-2 (67 parts by weight), isobornyl acrylate (20 parts by weight), N-vinylpyrrolidone (8 parts by weight), a hydroxypivalic acid neopentyl glycol diacrylate (5 parts by weight), and a photopolymerization initiator, Irgacure 1700 manufactured by Ciba Specialty Chemicals Co. (3 parts by weight) were compounded to obtain a coating composition 2.

Example 3

According to the same manner as Example 1, 2,4-toluene diisocyanate (522.6 g), polytetramethylene ether glycol having a number average molecular weight of 3,000 (315.0 g) and polyoxypropylene glycol having a number average molecular weight of 2,000 (390.0 g) were reacted.

After adding 2-hydroxyethyl acrylate (638.9 g), 2,6-di-tert-butylhydroxytoluene (0.56 g) as a polymerization inhibitor and stannous octoate (0.05 g) as a tin type reaction catalyst to the thus obtained reaction mixture, the operations were conducted as the same manner as Example 1 to obtain polyurethane acrylate oligomer A-3. The oligomer A-3 was a mixture of 20% by weight of a component having a number average molecular weight of 3,580, 27% by weight of a component having a number average molecular weight of 2,580 and 53% by weight of a component having a number average molecular weight of 406.

Thus obtained oligomer A-3 (70 parts by weight), isobornyl acrylate (20 parts by weight), N-vinylformamide (10 parts by weight) and a photopolymerization initiator, Irgacure 1700 manufactured by Ciba Specialty Chemicals Co. (3 parts by weight) were compounded to obtain a coating composition 3.

Example 4

According to the same manner as Example 1, 2,4-toluene diisocyanate (595.1 g), polytetramethylene ether glycol having a number average molecular weight of 3,000 (427.2 g), polyoxypropylene glycol having a number average molecular weight of 1000 (197.8 g), trioxypropylene glycol (86.6 g) and 12-hydroxystearyl alcohol (33.9 g) were reacted. After adding 2-hydroxyethyl acrylate (584.0 g), 2,6-di-tert-butylhydroxytoluene (0.58 g) as a polymerization inhibitor and 1,8-diazabicyclo[5.4.0]-7-undecene (0.58 g) as a reaction catalyst to the thus obtained reaction mixture, the operations were conducted as the same manner as Example 1 to obtain polyurethane acrylate oligomer A-4. The oligomer A-4 was a mixture of 27% by weight of a component having a number average molecular weight of 3,580, 16% by weight of a component having a number average molecular weight of 1,580, 5% by weight of a component having a number average molecular weight of 894, 18% by weight of a component having a number average molecular weight of 772 and 34% by weight of a component having a number average molecular weight of 406.

Thus obtained oligomer A-4 (67 parts by weight), isobornyl acrylate (23 parts by weight), N-vinylpyrrolidone (10 parts by weight), and a photopolymerization initiator, Irgacure 1700 manufactured by Ciba Specialty Chemicals Co. (3 parts by weight) were compounded to obtain a coating composition 4.

Example 5

According to the same manner as Example 1, 2,4-toluene diisocyanate (417.6 g) and the polyurethanepolyol having a number average molecular weight of 4,168 obtained in Preparation Example 1 (400.0 g) were reacted. After adding 2-hydroxyethyl acrylate (545.3 g), 2,6-di-tert-butylhydroxytoluene (0.54 g) as a polymerization inhibitor and 1,8-diazabicyclo[5.4.0]-7-undecene (0.54 g) as a reaction catalyst to the thus obtained reaction mixture, the operations were conducted as the same manner as Example 1 to obtain polyurethane acrylate oligomer A-5. The oligomer A-5 was a mixture of 34% by weight of a component having a number average molecular weight of 4,748 and 66% by weight of a component having a number average molecular weight of 406.

Thus obtained oligomer A-5 (70 parts by weight), isobornyl acrylate (20 parts by weight), N-vinylpyrrolidone (10 parts by weight) and a photopolymerization initiator, Irgacure 1700 manufactured by Ciba Specialty Chemicals (3 parts by weight) were compounded to obtain a coating composition 5.

Example 6

According to the same manner as Example 1, 2,4-tolylene diisocyanate (400.7 g), isophorone diisocyanate (66.7 g) and the urethanepolyol having a number average molecular weight of 6,168 obtained in Preparation Example 2 (616.8 g) were reacted.

After adding 2-hydroxyethyl acrylate (591.6 g), 2,6-di-tert-butylhydroxytoluene (0.5 g) as a polymerization inhibitor and stannous octoate (0.05 g) to the thus obtained reaction mixture, the operations were conducted as the same manner as Example 1 to obtain polyurethane acrylate oligomer A-6. The oligomer A-6 was a mixture of 41% by weight of a component having a number average molecular weight of 6,748 and 59% by weight of a component having a number average molecular weight of 412. Thus obtained oligomer A-6 (65 parts by weight), isobornyl acrylate (20 parts by weight), N-vinypyrrolidone (8 parts by weight), a diacrylate of 5-ethyl-2-(2-hydroxy-1,1-dimethylethyl)-5-(hydroxymethyl)-1,3-dioxane (KAYARAD R-604, manufactured by NIPPON KAYAKU CO., LTD.) (7 parts by weight) and a photopolymerization initiator, Irgacure 819 manufactured by Ciba Specialty Chemicals Co. (3 parts by weight) were compounded to obtain a coating composition 6.

Comparative Example 1

According to the same manner as Example 1, 2,4-toluene diisocyanate (587.9 g) and polytetramethylene ether glycol having a number average molecular weight of 3,000 (405.0 g) were reacted. After adding 2-hydroxyethyl acrylate (766.7 g), 2,6-di-tert-butylhydroxytoluene (0.53 g) as a polymerization inhibitor and 1,8-diazabicyclo[5.4.0]-7-undecene (0.53 g) as a reaction catalyst to the thus obtained reaction mixture, the operations were conducted as the same manner as Example 1 to obtain polyurethane acrylate oligomer A-7. The oligomer A-7 was a mixture of 28% by weight of a component having a number average molecular weight of 3,580 and 72% by weight of a component having a number average molecular weight of 406.

Thus obtained oligomer A-7 (70 parts by weight), isobornyl acrylate (20 parts by weight), N-vinylpyrrolidone (10 parts by weight) and a photopolymerization initiator, Irgacure 1700 manufactured by Ciba Specialty Chemicals Co. (3 parts by weight) were compounded to obtain a coating composition 7.

Comparative Example 2

According to the same manner as Example 1, 2,4-toluene diisocyanate (587.9 g), polytetramethylene ether glycol having a number average molecular weight of 650 (580.1 g) and polyoxypropylene glycol having a number average molecular weight of 400 (183.6 g) were reacted.

After adding 2-hydroxyethyl acrylate (470.3 g), 2,6-di-tert-butylhydroxytoluene (0.55 g) as a polymerization inhibitor and 1,8-diazabicyclo[5.4.0]-7-undecene (0.55 g) as a reaction catalyst to the thus obtained reaction mixture, the operations were conducted as the same manner as Example 1 to obtain polyurethane acrylate oligomer A-8. The oligomer A-8 was a mixture of 60% by weight of a component having a number average molecular weight of 1,230, 25% by weight of a component having a number average molecular weight of 980 and 15% by weight of a component having a number average molecular weight of 406.

Thus obtained oligomer A-8 (70 parts by weight), isobornyl acrylate (20 parts by weight), N-vinylpyrrolidone (10 parts by weight) and a photopolymerization initiator, Irgacure 1700 manufactured by Ciba Specialty Chemicals Co. (3 parts by weight) were compounded to obtain a coating composition 8.

Comparative Example 3

According to the same manner as Example 1, 2,4-toluene diisocyanate (618.4 g), polytetramethylene ether glycol having a number average molecular weight of 1,000 (532.5 g) and trioxypropylene glycol (238.6 g) were reacted. After adding 2-hydroxyethyl acrylate (420.0 g), 2,6-di-tert-butylhydroxytoluene (0.54 g) as a polymerization inhibitor and 1,8-diazabicyclo[5.4.0]-7-undecene (0.54 g) as a reaction catalyst to the thus obtained reaction mixture, the operations were conducted as the same manner as Example 1 to obtain polyurethane acrylate oligomer A-9. The oligomer A-9 was a mixture of 47% by weight of a component having a number average molecular weight of 1,580 and 53% by weight of a component having a number average molecular weight of 772.

Thus obtained oligomer A-9 (70 parts by weight), isobornyl acrylate (20 parts by weight), N-vinylpyrrolidone (10 parts by weight) and a photopolymerizatiion initiator, Irgacure 1700 manufactured by Ciba Specialty Chemicals Co. (3 parts by weight) were compounded to obtain a coating composition 9.

Evaluation Method

1. Preparation of a Cured Coating Film

Cured coating films were obtained by applying coating compositions 1–9, which had been obtained in aforementioned Examples 1–6 and Comparative Examples 1–3, in a thickness of about 200 μm on glass boards and then irradiating ultraviolet rays by a metahalide lamp with an exposure of 500 mJ/cm2 and a wave length of 350 nm.

2. Measurement of Elastic Modulus

After leaving the films obtained in 1. for 24 hours in an atmosphere of 50% RH at 25° C., 2.5%-tensile modulus (Young's modulus) was measured under the conditions of the bench mark width 40 mm and the tensile speed 1 mm/minute. Viscoelasticity was measured by viscoelastometer to calculate a ratio of storage modulus at 25° C. to 60° C.

3. Measurement of Tensile Elongation

After leaving the films obtained in 1. for 24 hours in an atmosphere of 50% RH at 25° C., a tension test was conducted under the conditions of the bench mark width 40 mm and a tensile speed 20 mm/min to measure a breaking elongation.

The viscosity of the coating compositions obtained in the above-mentioned Examples and Comparative Examples and physical properties of cured materials thereof are shown in TABLE 1.

TABLE 1

| | EXAMPLE 1 | EXAMPLE 2 | EXAMPLE 3 | EXAMPLE 4 | EXAMPLE 5 | EXAMPLE 6 | COMPARATIVE EXAMPLE 1 | COMPARATIVE EXAMPLE 2 | COMPARATIVE EXAMPLE 3 |
|---|---|---|---|---|---|---|---|---|---|
| Viscosity: cps | 3.900 | 3.700 | 3.300 | 3.500 | 3.100 | 3.990 | 4.200 | 6.000 | 8.000 |
| R (NCO/OH) | 3.5 | 5.0 | 10.0 | 3.8 | 25.0 | 26.0 | 25.0 | 2.5 | 2.0 |
| 800/1.000 [1] | 52/48 | 62/38 | 53/47 | 55/45 | 66/34 | 59/41 | 72/28 | 20/80 | 53/47 |
| Young's Modulus (2.5%-tensile modulus): MPa | 1000 | 1200 | 850 | 1000 | 1000 | 990 | 1100 | 1080 | 1100 |
| Tensile Elongation (breaking): % | 40 | 35 | 30 | 40 | 30 | 30 | 5 | 20 | 10 |
| Tg: ° C. | 101 | 106 | 113 | 110 | 118 | 106 | 120 | 81 | 91 |
| E' (25/60) [2] | 2.25 | 2.04 | 2.07 | 2.20 | 1.79 | 2.17 | 1.50 | 3.89 | 4.20 |

[1] A weight ratio of a component having a number average molecular weight of 800 or less to that having a number average molecular weight of 1,000 or more in polyurethane oligomer.
[2] E' (25/60) indicates a ratio of storage modulus at 25° C. to 60° C.

What is claimed is:

1. A coating composition for an optical fiber which comprises:
   (A) a polyurethane (meth)acrylate oligomer containing
       (d) a component with a number average molecular weight of 800 or less and (e) a component with a number average molecular weight of 1,000 or more, a proportion of the total amount of (d) and (e) to the total amount of (A) being 30% by weight or more, and a weight ratio of (d) to (e) being 51/49–70/30, which is obtained by subjecting (a) a polyisocyanate, (b) a polyol and (c) a (meth)acrylate monomer containing a hydroxyl group to a urethanation reaction; (B) an ethylenically unsaturated compound; and (C) a photopolymerization initiator, wherein said urethanation reaction is conducted under conditions that an equivalent ratio of NCO group in (a) to OH group in (b) is 3.1 to 30, and that a ratio of a remaining equivalent of NCO group calculated by subtracting the equivalent of OH group in (b) from the equivalent of NCO group in (a) to an equivalent of OH g roup in (c) is within a range of 0.9–1.1.

2. The coating composition for an optical fiber according to claim 1, wherein, in (A), a proportion of the total amount of (d) and (e) to the total amount of (A) is 40% by weight or more.

3. A method for producing a coating composition for an optical fiber, which comprises:

mixing (A) a polyurethane (meth)acrylate oligomer containing (d) a component with a number average molecular weight of 800 or less and (e) a component with a number average molecular weight of 1,000 or more, a proportion of the total amount of (d) and (e) to the total amount of (A) being 30% by weight or more, and a weight ratio of (d) to (e) being 51/49–70/30, which is obtained by subjecting (a) a polyisocyanate, (b) a polyol and (c) a (meth)acrylate monomer containing a hydroxyl group to a urethanation reaction; (B) an ethylenically unsaturated compound; and (C) a photopolymerization initiator, wherein said urethanation reaction is conducted under conditions that an equivalent ratio of NCO group in (a) to OH group in (b) is 3.1 to 30, and that a ratio of a remaining equivalent of NCO group calculated by subtracting the equivalent of OH group in (b) from the equivalent of NCO group in (a) to an equivalent of OH group in (c) is within a range of 0.9–1.1.

4. The method according to claim 3, wherein, in (A), a proportion of the total amount of (d) and (e) to the total amount of (A) is 40% by weight or more.

5. An optical fiber which is coated with the coating composition according to claim 1.

* * * * *